Figure 1:
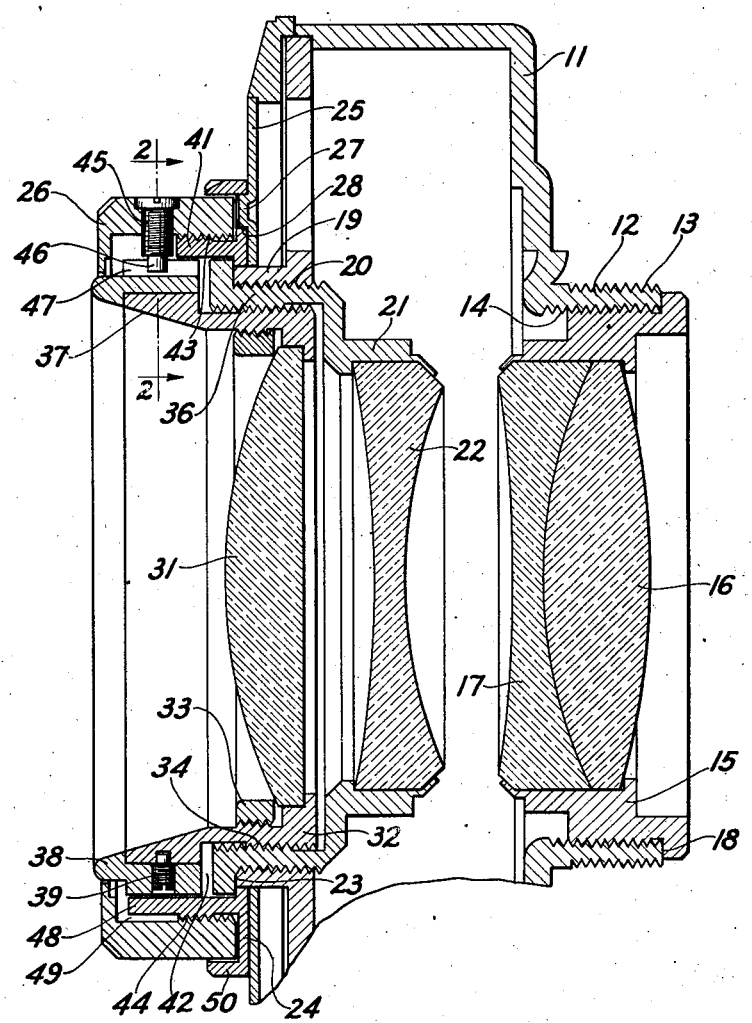

Jan. 27, 1942.    C. M. LEE    2,271,227
LENS MOUNT
Filed Feb. 14, 1940

CHARLES M. LEE
INVENTOR
BY
ATTORNEYS

Patented Jan. 27, 1942

2,271,227

UNITED STATES PATENT OFFICE 2,271,227

LENS MOUNT

Charles M. Lee, Rochester, N. Y., assignor to Eastman Kodak Company, Rochester, N. Y., a corporation of New Jersey Application February 14, 1940, Serial No. 318,901

5 Claims. (Cl. 88—57)

The present invention relates to lens mounts, and more particularly to lens mounts intended for use in connection with still cameras.

In many cameras of this class, the lens mount is provided with a plurality of lenses of different types which are suitably positioned in spaced relation in the mount. As is well known, focusing may be procured by moving only one of these lens members axially of the mount and relative to the fixed lens members. This actual focusing movement is secured by means of a focusing ring or cap carried by the mount. In the cameras now on the market, the connection between the movable lens and the focusing cap is such that the axial movement of these members is substantially equal so that a large axial movement is necessary to adjust the movable lens throughout its focusing limits. For reasons well known to those in the art, it is desirable to reduce such axial movement of the focusing cap to a minimum, yet provide for adjustment of the movable lens throughout its entire focusing range.

The present invention has, therefore, as its principal object an arrangement by which relatively large axial adjustment of the movable lens element may be procured with a relatively small axial movement of the focusing cap.

Still another object of the present invention is the provision of a differential moving means for the adjustable lens and the focusing cap which is simple in construction, inexpensive to manufacture, easy to manipulate, positive in its action.

To these and other ends, the invention resides in certain improvements and combinations of parts all as will be hereinafter more fully described, the novel features being pointed out in the claims at the end of the specification.

Figure 2:
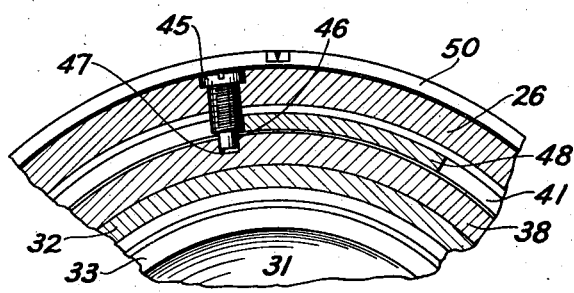

In the drawing:

Fig. 1 is a longitudinal sectional view through a lens mount constructed in accordance with the present invention; and Fig. 2 is a sectional view taken on line 2—2 of Fig. 1, showing the arrangement for operatively connecting the focusing cap to the movable lens cell, and also the limiting means for the focusing cap.

Similar reference numerals throughout the various views indicate the same parts.

The lens mount constructed in accordance with the present invention comprises a housing 11 which supports the various lens elements and the shutter, not shown. The rear end of the housing is formed with an annular member or ring 12 the outer surface 13 of which is threaded to engage a correspondingly threaded opening, not shown, in the front wall of the camera to secure the mount in position thereon. The inner surface 14 of the ring 12 is also threaded to receive a similarly threaded portion of a rear lens cell 15 in which are suitably mounted lenses 16 and 17. As the cell 15 is screwed into the ring 12, an annular shoulder 18 on the cell engages or abuts the end of the ring to position the cell 15 in the mount, as is apparent from inspection of Fig. 1.

The front of the housing 11 is also formed with a ring 19 the inner surface 20 of which is threaded to engage a correspondingly threaded portion of a front lens cell 21 on which is mounted a front lens 22. A shoulder 23 on the cell 21 abuts the end of the ring 19 to position the cell in the mount, as is apparent. The housing 11 thus forms a sleeve or tube in which the various lens members are mounted in fixed position and in proper spaced relation. The shoulder 23 preferably extends beyond the ring 19 and engages a disk-like member 24 to retain the latter in position against a shutter dial plate 25 which is secured, in any suitable and well-known manner, to the housing 11. In order to prevent turning of the member 24 when the focusing cap 26 is adjusted, as will be later described, the plate 25 is formed with a protuberance or lug 27 which extends into a registering opening 28 in the member 24.

Focusing is secured by movement of a front lens 31 which is adjusted axially toward or away from the front fixed lens 22, as is well known. The lens 31 is mounted in an adjustable lens cell 32 and is retained in place therein by a retaining ring 33. The outer cylindrical surface of the cell 32 is threaded at 34, in a manner later described, to engage a correspondingly threaded section formed on the inner surface of a forwardly extending portion 36 of the stationary cell 21, as clearly shown in Fig. 1. It is now apparent that if the cell 32 is rotated it will move axially, by reason of the threaded connection 34, relative to the other fixed lenses 16, 17, and 22, to secure the proper focus. This front lens cell 32 is formed with a flared or throat portion 37 on which is loosely mounted a ring 38 which is normally connected to the cell 32 by a setscrew 39. This ring 38 is connected, in a manner to be later described, to the focusing cap 26 so that turning movement of the latter is transmitted to the cell 32 to move the latter axially to adjust the position of the lens 31. During prefocusing, however, the setscrew 39 is withdrawn so that the ring 38, and hence the focusing cap 36, will be disconnected from the adjustable lens 31. The latter is then prefocused, after which the screw 39 is again screwed in to connect the ring 38 to the cell 32. This prefocusing is a factory adjustment, and as far as the user is concerned the ring 38 may be broadly considered as a part of, and movable as a unit with, the lens cell 32.

The member 24 is formed with a forwardly extending annular portion or ring 41 which covers the opening or space 42 formed between the lens cells 21 and 32, as shown in Fig. 1. This cover ring 41 has the outer surface thereof threaded, as shown at 43, to receive a correspondingly internally threaded portion formed on the inner surface 44 of the focusing cap 26 which overlies the cover ring 41 and the prefocusing ring 38. It is apparent that when the focusing cap is rotated it will move axially along the cover ring 41 by reason of the thread 43. A stud 45 extends through the cap 26 and has a lower reduced end portion 46 which extends into an axially extending slot 47 formed on the periphery of the prefocusing ring 38. The stud 45 thus operatively connects the focusing cap 26 to the prefocusing ring 38 and hence to the adjustable lens cell 32 so that turning of the cap will also turn the cell 32 to move the latter axially of the housing 11. The pin and slot connection 46 and 47 afford a slip or spline connection between the focusing cap 26 and the cell 32, the purpose of which construction will be later pointed out. The cover ring 41 is formed with a fixed forwardly extending lug 48 which is positioned in a recess 49 formed on the under side of the focusing cap 26. This lug is arranged in the path of the stud 45 and is adapted to be engaged thereby, as shown in Fig. 2, to limit movement of the cap in both directions.

It is now apparent from the above description, that any turning movement of the focusing cap 26 will simultaneously move the latter axially along the thread 43. This turning of the cap is transmitted through the stud and slot connections 46 and 47 to also rotate the lens cell 32 so that the latter is also moved axially along the thread 34 to adjust the front lens 31 relative to the fixed lenses 16, 17, and 22 to secure the desired focus. A suitable scale, not shown, is formed on the cap 26 so as to secure the desired focusing adjustment. In order to adjust the lens 31 over its entire focusing range, a relatively large axial movement of the lens is necessary, as indicated by the length of the thread 34. It is desirable, however, to secure this relatively large axial movement of the lens 31 by means of a relatively small axial movement of the focusing cap 26, the advantages of which will be apparent to those in the art.

To secure this result, the thread 43 is made a single thread while thread 34 is formed as a multiple thread which, in the present instance, is of a slightly coarser pitch than the thread 43, thus providing a differential threaded connection between the housing 11 and the focusing cap 26 and lens cell 32. The thread 43 may thus be broadly considered as a fine pitch thread while thread 34 may be deemed a coarse pitch thread. Obviously various other thread combinations may be utilized to afford the desired relative axial movement between the cap 26 and the adjustable lens cell 32. By means of this arrangement, the turning of the focusing cap 26 will move the latter axially a relatively short distance along the fine thread 43, while the cell 32 and lens 31 will be moved axially a relatively large distance by reason of the coarse thread 34, thus securing the desired adjustment with only slight axial movement of the cap 26. A portion 50 of the member 24 is arranged to overlie the cap 26 so as to cover the space formed between the latter and the member 24 as the cap is moved during focusing, as shown in Fig. 1.

As the front lens cell 32 is movable on the stationary cell 21, the cell 32 may be broadly considered as being adjustable on the housing 11. Furthermore, the focusing cap 26 is adjusted on the cover ring 41, and as the latter is also stationary, the cap 26 may be broadly considered as also movable or adjustable on the housing 11. Therefore, the focusing cap 26 and the movable cell 32 may be deemed to be relatively adjustable along differential threads formed on the housing 11 so as to afford a large adjustment on the cell 32 for a much smaller movement of the focusing cap 26, thus clearly fulfilling the principal object of the invention.

While one embodiment of the invention has been disclosed, it is to be understood that the inventive idea may be carried out in a number of ways. This application, therefore, is not to be limited to the precise details disclosed, but is intended to cover all variations and modifications thereof falling within the spirit of the invention or the scope of the appended claims.

I claim:

1. In a lens mount, the combination with a supporting housing, of a lens cell positioned in and adjustable axially of said housing for focusing, a manually revoluble focusing cap mounted on and adjustable axially of said housing, differential threaded connections between said housing and said cell and between said housing and said cap whereby adjustments of the latter provide relative axial movement of said cell and cap, and a slip connection between said cell and cap to permit the relative axial movement of said cell and cap.

2. In a lens mount, the combination with a supporting housing, of a lens cell positioned in and adjustable axially of said housing for focusing, a manually revoluble focusing cap mounted on and adjustable axially of said housing, a coarse thread connection between said housing and said cell, a fine threaded connection between said housing and said cap, said connections permitting relative axial movement between said cell and cap upon rotation of the latter whereby a relatively small axial adjustment of said cap will provide a relatively large axial adjustment of said cell, and a spline connection between said cell and cap.

3. In a lens mount, the combination with a supporting housing, of a lens cell positioned in and adjustable axially of said housing for focusing, a cover ring mounted on said housing, a manually revoluble focusing cap overlying said cover ring, a thread of one pitch connecting said cap to said ring for rotative and axial movement thereon, a thread of a different pitch connecting said cell to said housing, and a spline connection between said focusing cap and said cell, said threads providing a differential connection between said housing and said cell and cap whereby turning of the latter affords a relative axial movement between said cap and cell.

4. In a lens mount, the combination with a supporting housing, a lens cell mounted in fixed position in said housing, of a second lens cell positioned in and adjustable axially of said first cell for focusing, a cover ring mounted on and secured to said housing, a manually revoluble focusing cap overlying said ring, a fine threaded connection between said ring and cap to permit turning and axial movement of said cap on said ring, a coarse threaded connection between said cells to permit turning and axial movement of said second cell on said first cell for focusing, a spline connection between said second cell and said cap, said threaded connections affording a relatively large axial adjustment of said second cell for a relatively small axial movement of said cap, and means on said ring for limiting the turning movement of said cap.

5. In a lens mount, the combination with a supporting housing, a lens cell mounted in fixed position in said housing, of a second lens cell positioned in and adjustable axially of said first cell for focusing, a cover ring mounted on and secured to said housing, a manually revoluble focusing cap overlying said ring, a fine threaded connection between said ring and cap to permit turning and axial movement of said cap on said ring, a coarse threaded connection between said cells to permit turning and axial movement of said second cell on said first cell for focusing, an annular member loosely mounted on said second cell, means for detachably connecting said member to said cell to permit disengagement of said cell during prefocusing, said member having a slot formed therein, a stud carried by said cap and having a portion extending into said slot to provide a spline connection between said second cell and said cap, said threaded connections providing means by which relatively large axial adjustments of said second cell may be obtained with relatively small axial movements of said cap, and a shoulder on said ring positioned in the path of said stud to limit the turning movement of said cap.

CHARLES M. LEE.